United States Patent
Huang et al.

(10) Patent No.: US 7,746,597 B2
(45) Date of Patent: Jun. 29, 2010

(54) SLIDER HAVING PROTECTIVE FILMS OF DIFFERING HYDROGEN CONTENT

(75) Inventors: Jian Hui Huang, Hong Kong (CN); Ryuji Fujii, Hong Kong (CN)

(73) Assignee: SAE Magnetics (H.K.) Ltd., Hong Kong (CN)

(*) Notice: Subject to any disclaimer, the term of this patent is extended or adjusted under 35 U.S.C. 154(b) by 724 days.

(21) Appl. No.: 11/602,467

(22) Filed: Nov. 21, 2006

(65) Prior Publication Data

US 2007/0115589 A1    May 24, 2007

(51) Int. Cl.
  *G11B 5/187*  (2006.01)
  *G11B 5/60*   (2006.01)
  *G11B 5/31*   (2006.01)

(52) U.S. Cl. .................... 360/122; 360/235.2

(58) Field of Classification Search ... 360/235.1–237.1, 360/122
  See application file for complete search history.

(56) References Cited

U.S. PATENT DOCUMENTS

| | | | | |
|---|---|---|---|---|
| 5,901,021 A | * | 5/1999 | Hirano et al. | 360/122 |
| 6,132,875 A | * | 10/2000 | Kiuchi et al. | 360/122 |
| 6,624,977 B1 | * | 9/2003 | Boutaghou | 360/235.2 |
| 2001/0019467 A1 | * | 9/2001 | Otsuka et al. | 360/235.2 |

FOREIGN PATENT DOCUMENTS

| | | |
|---|---|---|
| JP | 4-364217 | 12/1992 |
| JP | 10-3630 | 1/1998 |
| JP | 2000-222714 | 8/2000 |
| JP | 2001-266324 | 9/2001 |

* cited by examiner

*Primary Examiner*—Craig A. Renner
(74) *Attorney, Agent, or Firm*—Nixon & Vanderhye P.C.

(57) ABSTRACT

A slider comprises an air bearing surface which is arranged to face a recording medium and a protective film which covers at least a part of the air bearing surface. The protective film includes a first protective film formed on the air bearing surface and made of an amorphous material based on carbon and hydrogen and a second protective film formed to cover the first protective film and made of an amorphous material based on carbon and hydrogen. Further, the atomic fraction of hydrogen in the second protective film is lower than that in the first protective film.

11 Claims, 8 Drawing Sheets

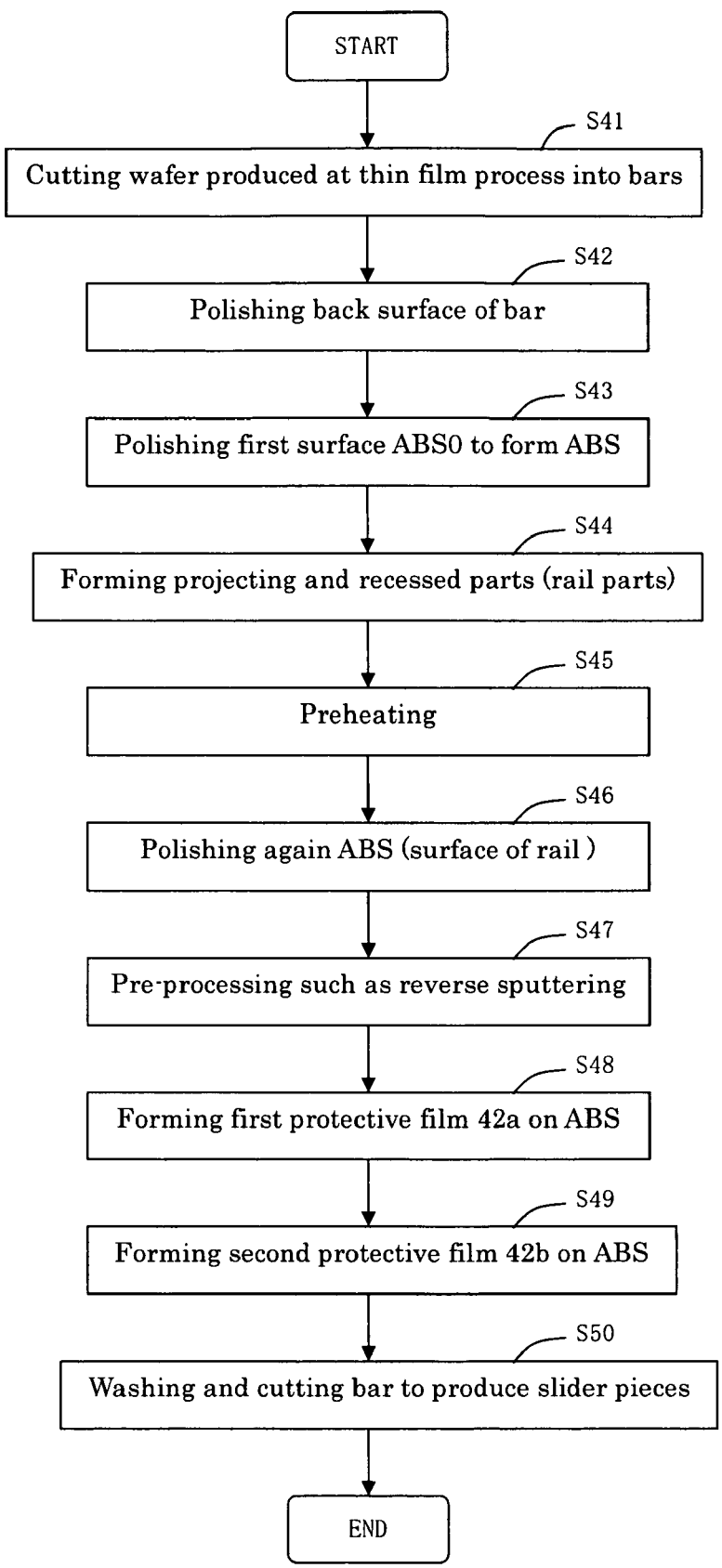

SLIDER HAVING PROTECTIVE FILMS OF DIFFERING HYDROGEN CONTENT

The present application is based on, and claims priority from, J.P. Application No. 2005-338485, filed Nov. 24, 2005, the disclosure of which is hereby incorporated by reference herein in its entirety.

BACKGROUND OF THE INVENTION

1. Field of the Invention

The present invention relates to a slider used in a hard disc drive or the like and a method of producing the slider, and in particular, to the structure of a protective film formed on a air bearing surface of the slider and a method of forming the same.

2. Description of the Related Art

A magnetic head slider (hereinafter referred to as slider) may make contact with a recording medium (magnetic disk) in a hard disc drive, for example at the time of starting the drive employing a contact start/stop method or at the time that a hard disc is subjected to external shock while in operation. A protective film composed of diamond like carbon (DLC) or the like for preventing the slider from making contact is formed on the air bearing surface (ABS) of the slider. Similarly, a protective film composed of DLC or the like is formed on a recording layer of the recording medium.

The DLC film formed on the air bearing surface is formed using a thin film forming technique such as sputtering or vapor deposition. Since the surface of substrate made of $Al_2O_3$—TiC-based ceramics (AlTic) which is the principal material of the slider is heated when the film is formed, the DLC film is distorted by the difference in the thermal expansion coefficient between the substrate and the DLC film when the film is cooled after being formed. Because the DLC film is high in hardness (high rigidity), it is subjected to larger internal stress (contraction stress) than film made of a different material if both films are distorted to the same degree. Therefore, even a small shock will likely cause the DLC film to release internal stress and cause it to peel off from the substrate. Since the DLC film does not have enough adhesive force to the AlTic substrate, an intermediate layer (adhesive layer) consisting of Si (silicon) or the like is generally provided beneath the DLC film. That is set forth, for example, in Japanese Patent Laid-Open No. H04-364217, H10-3630, 2001-266324 and 2000-222714.

Incidentally, it has been known that DLC largely changes in strength such as hardness and toughness with the addition or the reduction of hydrogen. Japanese Patent Laid-Open No. H10-3630 and 2001-266324 have disclosed proposals in which a multi-layer structure DLC film with excellent functions can be formed by varying the conditions for forming a film when DLC is used as a protective film of the slider.

Japanese Patent Laid-Open No. 2000-222714 has proposed a method of producing a pad consisting of DLC formed on the air bearing surface. This publication has disclosed a technique in which a material substance of the pad is deposited by vapor deposition at a tilted angle with respect to a line normal to the air bearing surface when the DLC film is deposited using filtered cathodic arc vapor deposition (FACVD or FCVA).

The protective film based on conventional art described above has no problem in terms of its performance as the protective film for the slider, however, it has the following other problems. First, two or more targets are required because a material entirely different from DLC is used in the intermediate layer (adhesive layer). This increases the cost because the structure of a film forming device is complicated or two film forming devices are required. The adoption of multi-layer structure DLC film as disclosed in Patent Document 2 requires at least three layers made of the intermediate layer (adhesive layer) and multi-layer structure DLC layers, and therefore the film can be totally thickened. This makes it difficult to decrease the distance between a magnetic head (a writing element and a reading element) and the recording layer of the recording disc (so-called a distance of magnetic space), which becomes a hindrance to increasing recording density.

SUMMARY OF THE INVENTION

It is desired that a technique for forming a DLC film with a sufficient adhesive force be established to eliminate the need for the intermediate layer (adhesive layer) in order to resolve the above problems at the same time. A DLC film comparable in performance to the DLC protective film having a Si intermediate layer has not been realized until now. Then, it is an object of the present invention to provide a slider and a method of producing the slider in which a sufficient adhesive force against the substrate can be obtained only from the DLC film without using the intermediate layer (adhesive layer).

According to one aspect of the invention, a slider comprising an air bearing surface which is arranged to face a recording medium and a protective film which covers at least a part of the air bearing surface. The protective film includes a first protective film formed on the air bearing surface and made of an amorphous material based on carbon and hydrogen and a second protective film formed to cover the first protective film and made of an amorphous material based on carbon and hydrogen. Further, the atomic fraction of hydrogen in the second protective film is lower than that in the first protective film.

A film (DLC film) made of amorphous material based on carbon and hydrogen has properties in which the film increases in hardness as the atomic fraction of hydrogen in the film becomes lower and the film decreases in hardness as the atomic fraction of hydrogen in the film becomes higher. In addition, hardness is proportional to internal stress at the time of film formation. According as hardness increase, internal stress increases and adhesiveness decreases. On the other hand, according as hardness decreases, internal stress decreases and adhesiveness is improved. The first protective film is formed to be relatively higher in the atomic fraction of hydrogen, so that harness decreases to improve adhesiveness with the air bearing surface. The second protective film is formed to be relatively lower in the atomic fraction of hydrogen, so that hardness increases to harden the surface of the protective film, thus increasing abrasive resistance. This makes two requirements compatible with each other, two requirements being improvement in adhesiveness with the air bearing surface and securement of abrasive resistance.

The atomic fraction of hydrogen in the second protective film preferably ranges between at least a minimum of 6% and a maximum of 14%. On the other hand, the atomic fraction of hydrogen in the first protective film preferably ranges between at least a minimum of 25% and a maximum of 28%.

According to another aspect of the invention, a method of producing a slider comprising the step of causing ion beams of inert gas to be incident on a air bearing surface, which is arranged to face a recording medium and has been polished in advance, at a tilted angle with respect to a line normal to the air bearing surface in an atmosphere of active gas based on carbon and hydrogen to directly deposit a first amorphous material based on carbon and hydrogen on the air bearing surface; and the step of causing the ion beams of inert gas to be incident on the air bearing surface, on which the first carbon hard film is deposited, at an angle substantially perpendicular to the air bearing surface in an atmosphere of the active gas to deposit a second amorphous material based on carbon and hydrogen thereon.

According to another aspect of the invention, a method of producing a slider comprising the step of causing ion beams based on carbon and hydrogen to be incident on a air bearing surface, which is arranged to face a recording medium and has been polished in advance, at a tilted angle with respect to a line normal to the air bearing surface to directly deposit a first amorphous material based on carbon and hydrogen on the air bearing surface; and the step of causing the ion beams based on carbon and hydrogen to be incident on the air bearing surface, on which the first carbon hard film is deposited, at an angle substantially perpendicular to the air bearing surface to deposit a second amorphous material based on carbon and hydrogen thereon.

According to another aspect of the invention, a method of producing a slider comprising the step of causing ion beams based on carbon and hydrogen to be incident on a air bearing surface, which is arranged to face a recording medium and which has been polished in advance, at a tilted angle with respect to a line normal to the air bearing surface to directly deposit a first amorphous material based on carbon and hydrogen that are on the air bearing surface; and the step of causing ion beams of inert gas to be incident on the air bearing surface, on which the first carbon hard film is deposited, at an angle substantially perpendicular to the air bearing surface in an atmosphere of active gas based on carbon and hydrogen to deposit a second amorphous material based on carbon and hydrogen thereon.

According to another aspect of the invention, a method of producing a slider comprising the step of causing ion beams of inert gas to be incident on a air bearing surface, which is arranged to face a recording medium and which has been polished in advance, at a tilted angle with respect to a line normal to the air bearing surface in an atmosphere of active gas based on carbon and hydrogen to directly deposit a first amorphous material based on carbon and hydrogen that are on the air bearing surface; and the step of causing ion beams based on carbon and hydrogen to be incident on the air bearing surface, on which the first carbon hard film is deposited, at an angle substantially perpendicular to the air bearing surface to deposit a second amorphous material based on carbon and hydrogen thereon.

The tilted angle preferably ranges between at least a minimum of 30 degrees and a maximum of 60 degrees.

The ion beam vapor deposition method may be used for depositing the first and the second amorphous material.

As described above, according to the present invention, two requirements of improvement in adhesiveness with the air bearing surface and securement of abrasive resistance can be compatible with each other. For this reason, it is possible to provide a slider in which a sufficient adhesive force against the substrate can be obtained only from the DLC film without using the intermediate layer (adhesive layer). As a result, the structure of a film forming device is less complicated or it is no longer necessary to prepare two film forming devices which results in a cost reduction.

The above and other objects, features and advantages of the present invention will become apparent from the following description with reference to the accompanying drawings which illustrate examples of the present invention.

BRIEF DESCRIPTION OF THE DRAWINGS

FIG. 4 is a flow chart showing a method of producing the slider of the present invention;

DETAILED DESCRIPTION OF THE PREFERRED EMBODIMENTS

Figure 1:
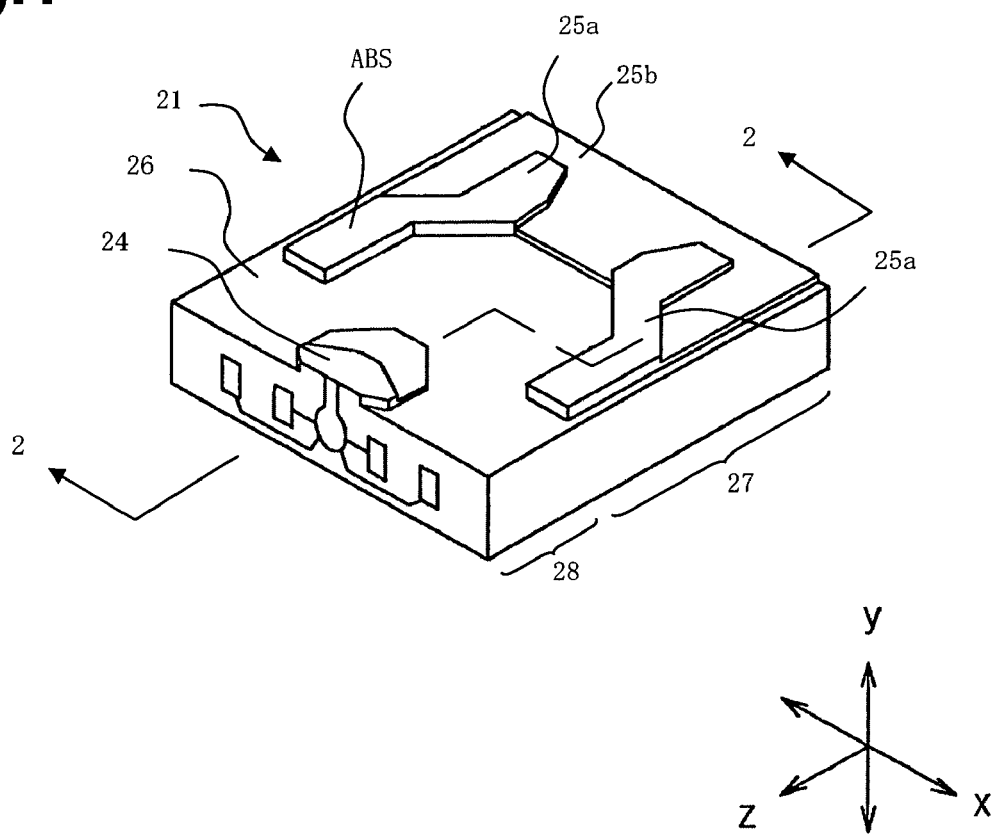
FIG. 1 is a perspective view of a slider related to one embodiment of the present invention.

First, the slider of the present invention is described with reference to the drawings. FIG. 1 is a perspective view of a slider related to one embodiment of the present invention. In the figure a rotatably driven circular recording medium (not shown) is positioned over slider 21. Slider 21 includes substrate 27 and thin film magnetic head part 28. Slider 21 is substantially hexahedral and one out of six surfaces thereof is arranged to face the recording medium. The surface is referred to as "the air bearing surface (ABS)". Projecting and recessed parts are formed on the air bearing surface (ABS) of slider 21. The projecting parts consist of reading and writing part 24 where reading element and writing element of thin film magnetic head part 28 are provided, and also consist of rail parts 25*a* and 25*b* which have a step. The other areas are referred to as recessed part 26.

When a recording medium rotates, the airflow passing between the recording medium and slider 21 generates a lift which acts on slider 21 downwardly in direction "y." Slider 21 is floated by the lift above the surface of the recording medium. Direction "x" refers to the direction to which a slider crosses the track of the recording medium, and direction "z" refers to a circumferential direction of the recording medium. Rail part 25*a*, as a whole, is formed along direction "z," thin film magnetic head part 28 is formed at end of the slider 21 on the side where air flows out (lower left end in the figure). That is to say, air enters from a small space between rail part 25*b* and the recording medium, hits reading and writing part 24 while being straightened by rail parts 25*a* on both sides, and flows through and escapes from a space between reading and writing part 24 and the recording medium, thereby causing slider 21 to float above the recording medium. Thus, slider 21 can be made to float above the recording medium by the projecting and recessed parts of the air bearing surface (ABS) while thin film magnetic head element part 28 reads from and writes in the recording medium.

Figure 2:
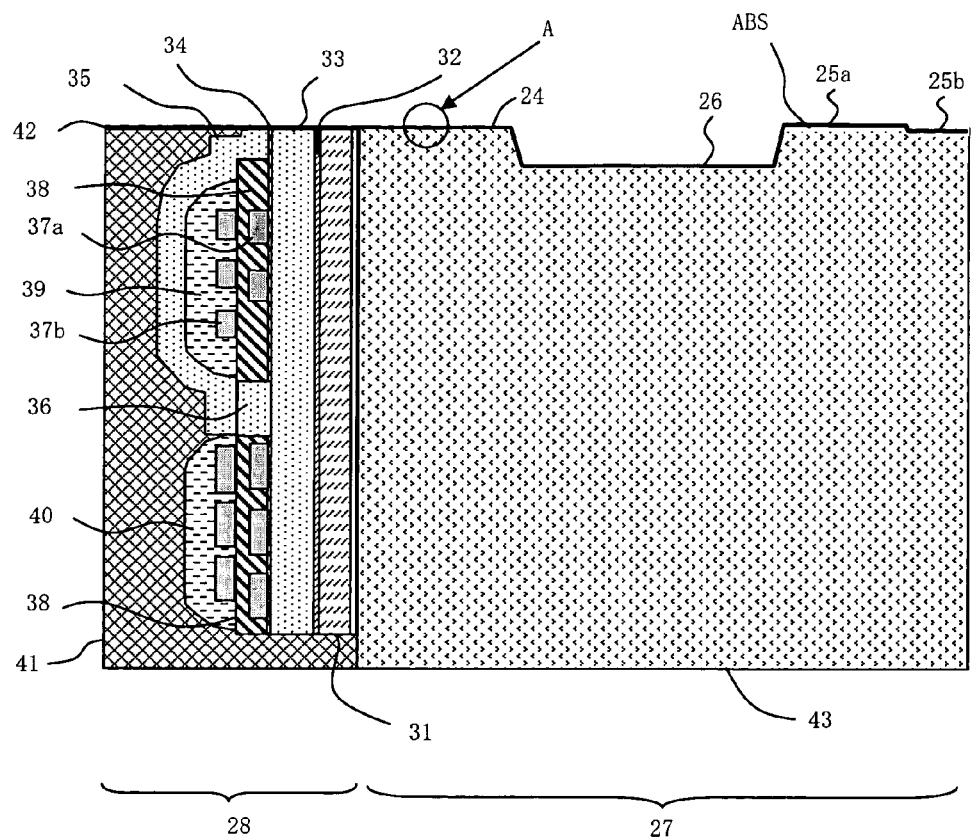
FIG. 2 is a cross section of the slider shown in FIG. 1 along line 2-2 therein.

FIG. 2 is a cross section of the slider shown in FIG. 1 along line 2-2 therein. The recording medium (not shown) extends over the air bearing surface (ABS) in FIG. 2, and is parallel to the air bearing surface. While thin film magnetic head part 28 includes a magnetoresistance element which reads the magnetic record from the recording medium and an induction type magnetic transducer which writes the magnetic record in the recording medium, thin film magnetic head part 28 may include either one of them. The induction type magnetic transducer may employ either a longitudinal recording system which enables recording in the in-plane direction of the recording medium or a perpendicular recording system which enables recording in the out-of-plane direction of the recording medium.

Thin film magnetic head part 28 is structured in such a manner that layers are stacked one on top of another leftward over substrate 27 made of ceramic material such as AlTic on the right side in the figure. Shield layer 31 of permalloy (NiFe), for example, is formed over substrate 27 (on the left side in the figure, hereinafter the same applies) with an insulating layer between shield layer 31 and substrate 27. MR element 32 which is a reading element is arranged on shield layer 31 to face the air bearing surface (ABS). Such elements as Anisotropic Magneto Resistance (AMR) element, Giant Magneto Resistance (GMR) element, or Tunneling Magneto Resistance (TMR) element using magneto-sensitive film showing a magnetoresistance effect may be used as MR element 32. In addition, MR element 32 is connected to a pair of lead layers (not shown) for sending a read signal.

Lower magnetic pole layer 33 made of magnetic material such as permalloy or CoNiFe, for example, is formed on MR element 32. Lower magnetic pole layer 33 functions both as a lower magnetic pole layer of a recording head and as an upper shield layer of reproducing head (MR element 32).

Upper magnetic pole layer 35 is provided over lower magnetic pole layer 33 through recording gap 34 for insulation. As a material for recording gap 34, a nonmagnetic metallic material such as NiP, for example, is used. As a material for upper magnetic pole layer 35, a magnetic material such as permalloy or CoNiFe, for example, is used. Lower magnetic pole layer 33 and upper magnetic pole layer 35 are connected to each other by connecting part 36 and form, as a whole, one U-shaped magnetic material.

Two-tiered coils 37a and 37b made of a conductive material such as copper or the like are provided between upper magnetic pole layer 35 and lower magnetic pole layer 33. Coils 37a and 37b are wound around connecting part 36 and supply magnetic flux to upper magnetic pole layer 35 and lower magnetic pole layer 33. Coil 37a is surrounded with insulating layer 38 and coil 37b is surrounded with insulating layers 39 and 40 to be insulated from the periphery. The two-tiered structure is exemplary only, a one-tiered or a multiple-tiered structure such as three-tiered or more, may be employed. Coil 37b is connected to a lead layer (not shown) for receiving an external current signal. Finally, overcoat layer 41 is formed to cover upper magnetic pole layer 35 and the lead layer. As a material for overcoat layer 41, an insulating material such as alumina is used, for example.

Referring to FIG. 1 as well as FIG. 2, rail part 25a on the air bearing surface (ABS) is mostly projected toward the recording medium, and reading and writing part 24 is further retracted by 1 nm to 3 nm more than the rail part 25a with respect to the recording medium. The step between rail parts 25a and 25b is not always required. The step between reading and writing part 24 and recessed part 26 is 1 μm to 5 μm in height. On the air bearing surface (ABS), protective film 42 of DLC is formed. Protective film 42 does not always need to cover the entire air bearing surface (ABS), it may cover only the area projecting toward the recording medium such as reading and writing part 24 or rail parts 25a and 25b, for example. Back surface 43 of the air bearing surface (ABS) of slider 21 contacts a flexure (not shown) which supports slider 21.

Figure 3:
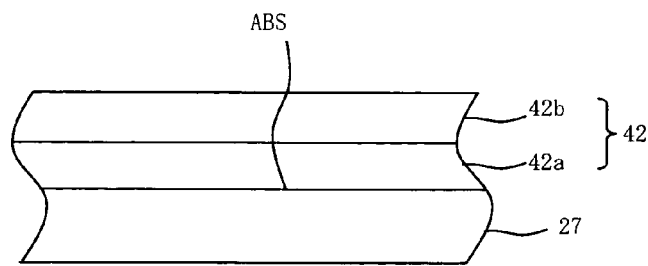
FIG. 3 is a partial cross section of a protective film at a part A in FIG. 2.

FIG. 3 is a partial cross section of the protective film at part A in FIG. 2. Protective film 42 consists of first protective film 42a formed on the air bearing surface (ABS) of substrate 27 and second protective film 42b formed to cover first protective film 42a. In the present embodiment, no intermediate layer (adhesive layer) made of Si or the like is provided between substrate 27 and first protective film 42a.

The atomic fraction of hydrogen in second protective film 42b is lower than that in first protective film 42a. The reason is described as follows. The DLC film is made of amorphous carbon hard film based on carbon and hydrogen. The DLC film has properties in which the film increases in hardness according as the proportion (atomic fraction) of hydrogen in the film becomes lower, and the film decreases in hardness according as the proportion (atomic fraction) of hydrogen in the film becomes higher. As stated above, hardness is proportional to internal stress at the time of film formation. According as hardness increases, internal stress increases and adhesiveness decreases. On the other hand, according as hardness decreases, internal stress decreases and adhesiveness is improved. Then, the atomic fraction of hydrogen in first protective film 42a that is in contact with substrate 27 is relatively higher to improve adhesiveness with substrate 27, and the atomic fraction of hydrogen in second protective film 42b is relatively lower to increase hardness, thereby increasing abrasive resistance. Incidentally, both first and second protective films 42a and 42b are made of DLC, and a difference in thermal expansion coefficient is negligible between both films, so that there exists no problem with adhesiveness between both films. Thus, in the present embodiment, it is possible to obtain sufficient adhesiveness with the substrate only from DLC film without using the intermediate layer (adhesive layer).

The atomic fraction of hydrogen in second protective film 42b preferably ranges between at least a minimum of 6% and a maximum of 14%. This enables second protective film 42b to be provided with sufficient hardness to increase abrasive resistance. The atomic fraction of hydrogen in first protective film 42a preferably ranges between at least a minimum of 25% and a maximum of 28%. This slightly lowers the hardness, however, adhesiveness between first protective film 42a and substrate 27 is improved.

In the next place, a method of producing the slider and in particular a method of forming the protective film discussed above are described in detail using the flow chart in FIG. 4, step charts in FIGS. 5A and 5B and FIGS. 6A to 6C, and FIG. 7.

Figure 5A:
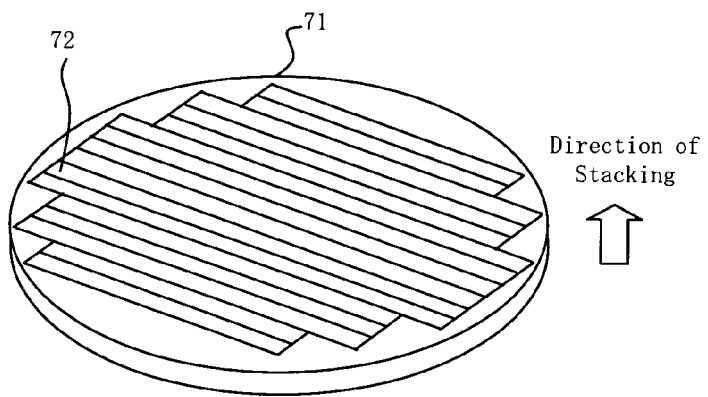
FIGS. 5A and 5B show steps for the method of producing the slider of the present invention.
Figure 5B:
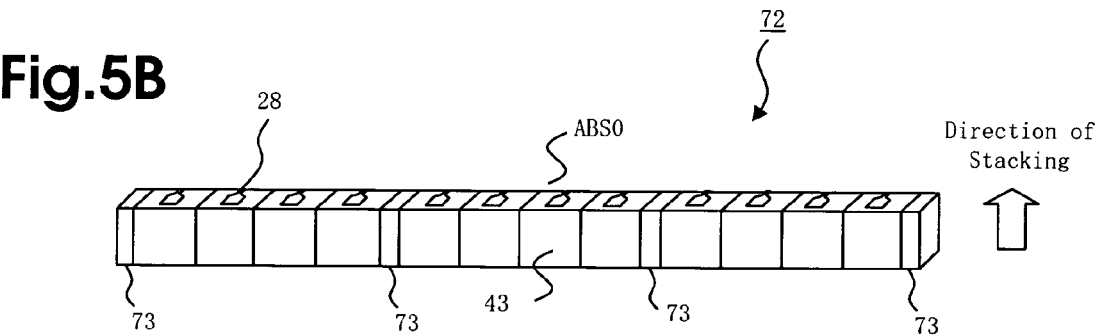

Step 41: As shown in FIG. 5A, a number of thin film magnetic head parts 28 are stacked on wafer 71 by thin film process and wafer 71 is cut into a plurality of strip-like bars 72 as shown in FIG. 5B. One measuring element 73 is in advance provided with each plural thin film magnetic head part 28 on wafer 71 and cut bar 72 to control the polishing amount in the following step S42.

Step S42: Next, back surface 43 of bar 72 is polished. Polishing is carried out, for example, in such a manner that bar 72 is fixed to a rotating polishing table with back surface 43 pressed thereon while water soluble or oil based lapping compound solution containing diamond abrasive grains is being supplied. This smoothes back surface 43 and completed slider 21 is firmly fixed to the flexure.

Figure 6A:
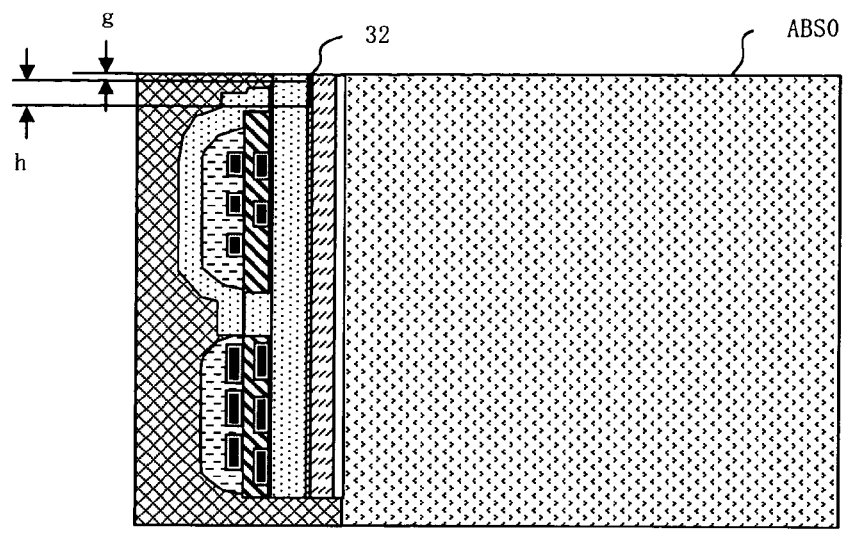
FIGS. 6A to 6C show steps for the method of producing the slider of the present invention.
Figure 6B:
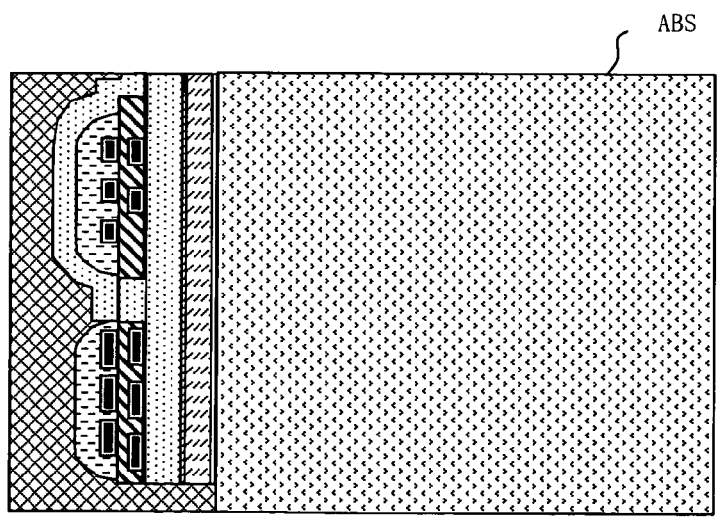

Step S43: The surface of bar 72 which faces the recording medium (hereinafter referred to as "first surface ABS0") is polished to form the air bearing surface (ABS). As shown in FIG. 6A, the MR height "h" of MR element 32 (height between the air bearing surface [ABS] and the end on the opposite side of MR element) has been formed so that there is some tolerance. Polishing first surface ABS0 by a predetermined polishing amount "g" enables a predetermined MR height to be formed. Polishing is carried out, for example, in such a manner that first surface ABS0 of bar 72 is pressed on the surface of a polishing plate formed by embedding diamond abrasive grains in the surface of a circular plate made of, for instance, Sn (tin). Thereby first surface ABS0 is moved inwardly while being polished and finally air bearing surface (ABS) is formed as shown in FIG. 6B.

Figure 6C:
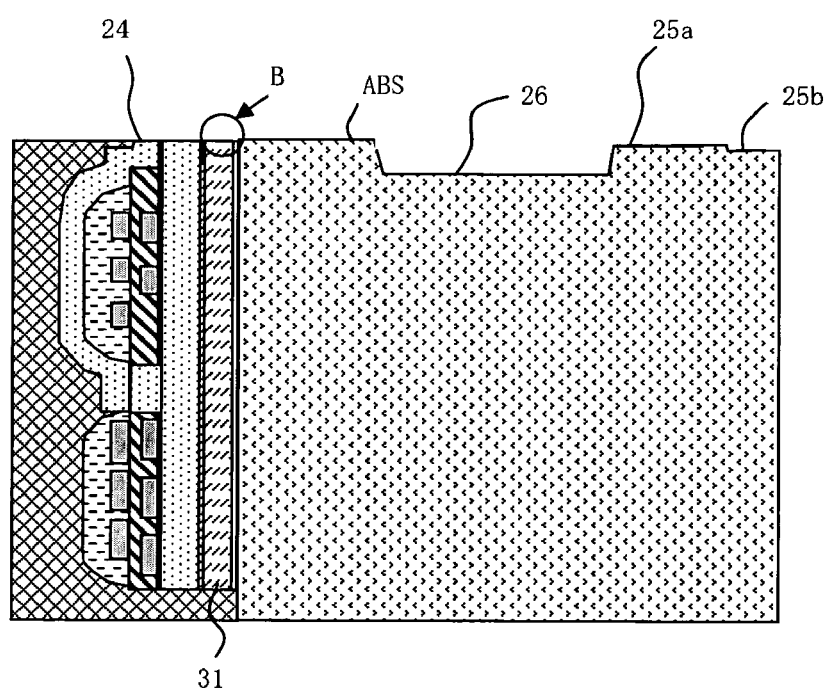

Step S44: As shown in FIG. 6C, projecting and recessed parts are formed on the air bearing surface (ABS). Specifically, a part of the air bearing surface (ABS) is removed by a dry etching process such as ion milling or reactive ion etching (RIE) to form reading and writing part 24, rail parts 25a and 25b, and recessed part 26.

Step S45: Bar 72 is preheated at 100° C. to 200° C. for one to two hours. This preheating is conducted to compensate for the difference in thermal deformation produced between substrate 27 and thin film magnetic head part 28 by the difference in temperature between the thin film magnetic head part 28 which is being polished and the thin film magnetic head part 28 which is being used as a product. The temperature reaches about 100° C. around thin film magnetic head part 28 (all layers which are formed) when a hard disc drive is driven, which causes difference in temperature between thin film magnetic head parts 28 and substrate 27, and the thermal expansion coefficient for substrate 27 is different from that of thin film magnetic head part 28 which causes overcoat layer 41 or the like to partially project and to produce steps. On the other hand, residual stress caused in substrate 27 and thin film magnetic head part 28 does not restore them to an original state before they were heated when the temperature returns to normal, which partially leaves a several-nm long protrusion on overcoat layer 41 or the like. In contrast, if bar 72 is preheated, then subjected to normal temperature, and polished afterward, residual stress is released, so that a protrusion will not be left when the temperature returns to normal even if heating and cooling are repeated.

Step S46: The air bearing surface (ABS) is polished again at normal temperature. This improves smoothness of rails 25a and 25b and reading and writing part 24 and rounds the edges of the rail part or the like, which enables reduction of chipping off of edge parts and reduction of adhesion of foreign matters to the periphery of rail parts.

Step S47: The surface of the air bearing surface (ABS) is etched by 1 nm to 1.5 nm by a reverse sputtering process using argon gas before steps S48 and S49. Table 1 below shows one example of processing conditions for steps S47 to S49. In table 1, "0 Pa" means pressure less than the lowest measurable value.

TABLE 1

| | Step S47 (Pre-process such as reverse sputtering) | Step S48 (Formation of first protective film 42a) | Step S49 (Formation of second protective film 42b) |
|---|---|---|---|
| Degree of vacuum | <$4.1 \times 10^{-5}$ Pa (Optimum condition: $9.1 \times 10^{-6}$ Pa) | <$4.1 \times 10^{-5}$ Pa (Optimum condition: $1.5 \times 10^{-5}$ Pa) | <$4.1 \times 0^{-5}$ Pa (Optimum condition: $1.5 \times 10^{-5}$ Pa) |
| Introduced gas | Ar (Partial pressure: 0.057 Pa) $N_2$ (Partial pressure: 0 Pa) | Ar (Partial pressure: 0.09 Pa) $N_2$ (Partial pressure: 0 Pa) | Ar (Partial pressure: 0 Pa) $N_2$ (Partial pressure: 0 Pa) |
| Time | 10-90 seconds (Optimum condition: 30 seconds) | 8-14 seconds (Optimum condition: 11 seconds) | 36-47 seconds (Optimum condition: 42 seconds) |
| Power | 200-600 W (Optimum condition: 400 W) | 100-300 W (Optimum condition: 150 W) | 50-1800 W (Optimum condition: 780 W) |
| Temperature | 20-23° (Optimum condition: 21°) | 20-23° (Optimum condition: 21°) | 20-23° (Optimum condition: 21°) |
| Angle φ between line normal to ABS and ion beam | 10-90° (Optimum condition: 45-70°) | 10-90° (Optimum condition: 30-60°) | 10-90° (Optimum condition: 30-60°) |
| Rotation speed | 10-30 rpm (Optimum condition: 16 rpm) | 10-30 rpm (Optimum condition: 16 rpm) | 10-50 rpm (Optimum condition: 30 rpm) |

Figure 7:
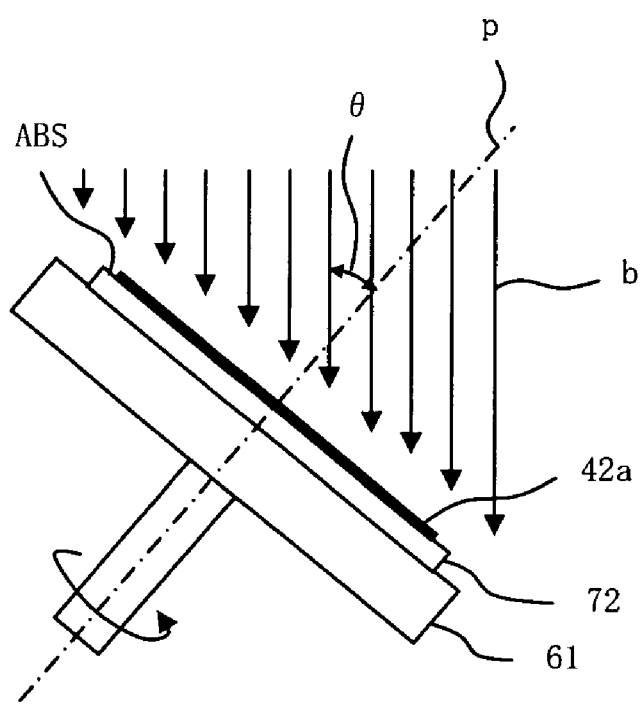
FIG. 7 is a schematic diagram showing a relationship between ion beams and extending direction of a bar.

Step S48: Next, first protective film 42a is formed on the air bearing surface (ABS). FIG. 7 is a schematic diagram showing the relationship between ion beam b and tilted bar 72. First protective film 42a is formed using the ion beam vapor deposition (IBD) method. Bar 72 on which the air bearing surface (ABS) and projecting and recessed parts have been formed are fitted to rotary jig 61 and then introduced into a chamber (not shown). Jig 61 rotates while being tilted at a predetermined angle with respect to ion beam b. As a result, ion beams b are incident on the air bearing surface (ABS) while being always tilted at first angle θ with respect to line "p" normal to the air bearing surface (ABS). Ion beam b is inert gas such as Ar (argon), $N_2$ (nitrogen). Ion beam b may be based on carbon and hydrogen. If ion beam b is inert gas, the chamber is filled with the vapor of CH-based active gas. Ion beams b react with the vapor to deposit a first amorphous material based on carbon and hydrogen, that is, the DLC film (first protective film 42a) on the substrate. If ion beam b is based on carbon and hydrogen, the chamber is filled with inert gas such as Ar (argon) and $N_2$ (nitrogen) at a low partial pressure, and ion beams b reach the substrate to form the DLC layer based on carbon and hydrogen. Table 1 shows process conditions for cases where an ion beam based on carbon and hydrogen is used as ion beam b, that is, where the filtered cathodic arc vapor deposition (FACVD or FCVA), which uses the so-called filtered cathodic arc method to form ion beam, is used. As shown in FIG. 7, first protective layer 42a is directly deposited on the air bearing surface (ABS) without interposing intermediate layer (adhesive layer) made of Si and others. It is preferable that first angle θ be selected from a range of 30 degrees to 60 degrees.

When ion beams b are incident at a predetermined angle θ with respect to line "p" normal to the air bearing surface (ABS), the content (atomic fraction) of hydrogen in first protective layer 42a increases. Although the reason is unclear, the inventor of the present invention presumes that the reason is attributable to the difference in electron orbit in C—C bond. That is to say, it seems that a molecule with Sp2 orbit captures hydrogen atoms in Sp2 and Sp3 orbits.

Step S49: In the next place, second protective layer 42b is formed on the air bearing surface (ABS), on which first carbon hard film 42a has been formed, in the chamber filled with the vapor of CH-based active gas. Unlike step S48, in this step, ion beams b are caused to be incident at an angle substantially perpendicular to the air bearing surface (ABS) i.e., first angle θ=0°, to cause vapor to react with ion beam b to deposit second amorphous material (second protective film 42b) based on carbon and hydrogen. As is the case with step S48, ion beam b may be based on carbon and hydrogen formed by the filtered cathodic arc method. The chamber is filled with inert gas such as Ar (argon), $N_2$ (nitrogen) at a low partial pressure. Table 1 shows process conditions for cases where ion beam based on carbon and hydrogen is used as ion beam b. Incidentally, in steps S48 and S49, it is optional whether to use ion beam based on carbon and hydrogen or to use inert gas as ion beam in the chamber filled with the vapor of CH-based active gas, so that four optional combinations are possible. If the same ion beam is used in steps S48 and S49, atmospheric condition in the chamber may be the same in both steps. The atomic fraction of hydrogen in second protective film 42b is made lower than that in first protective film 42a.

Step S50: Bar 72 is washed and then cut to produce slider pieces.

Figure 8A:
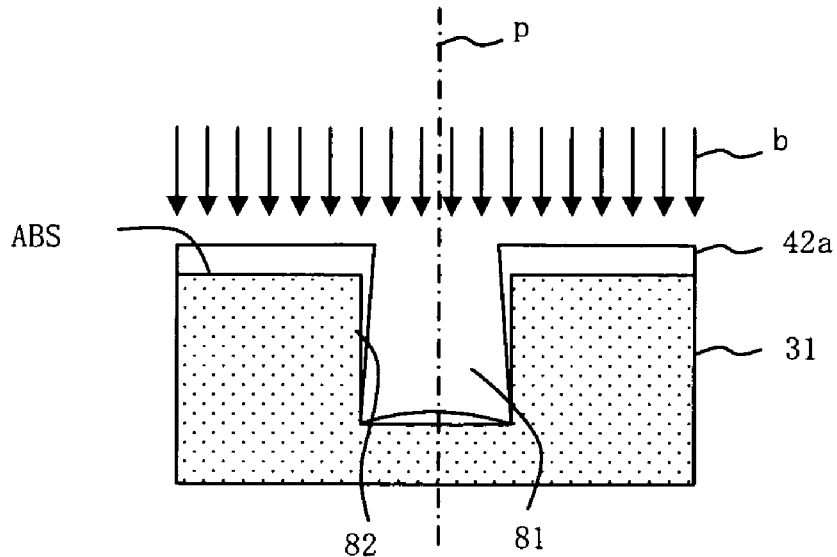
FIGS. 8A and 8B are partial cross sections at part B in FIG. 6C.
Figure 8B:
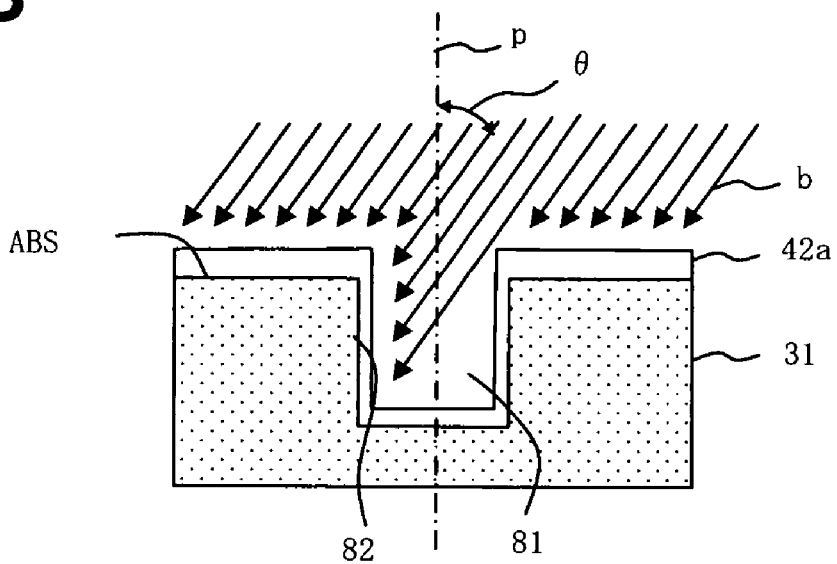

In step S48, ion beams caused to be incident at a predetermined angle with respect to line "p" normal to the air bearing surface further provide the following effect. FIGS. 8A and 8B are partial cross sections at part B in FIG. 6C. It is difficult to make the surface of the air bearing surface (ABS) perfectly smooth even by polishing. Actually there exist nanometer order holes and grooves (hereinafter represented by hole 81) on air bearing surface (ABS). If holes 81 are formed in shield layer 31 made of an Fe—Ni-based alloy, the alloy remains exposed, which causes corrosion. FIG. 8A shows states in which first carbon hard film 42a is formed in cases where ion beams are incident in normal direction "p" of the air bearing surface. Since ion beams b are difficult to be incident on side wall 82 of hole 81, first carbon hard film 42a is insufficiently formed on side wall 82. In contrast, FIG. 8B shows states in which first carbon hard film 42a is formed in cases where ion beams b are incident at a predetermined angle θ with respect to line "p" normal to the air bearing surface. Ion beams b are easier to be incident on side wall 82 of hole 81, first carbon hard film 42a is easily formed on side wall 82. As a result, according to the production method of the present embodiment, even if there are minute holes or grooves on the air bearing surface, the inside thereof can be covered with the DLC film. Therefore, this method decreases the possibility of corrosion of the air bearing surface, which enables improving the reliability of the slider and the hard disc drive.

EXAMPLE

The method of forming the protective film described above was applied to a slider. As a result of having deposited film under the "optimum conditions" in Table 1, the DLC films shown in the following were obtained. "HV" refers to Vickers hardness as shown below:
First carbon hard film 42a
Film thickness: 1 nm
Atomic fraction of hydrogen: 25% to 28%
Hardness: 1400 HV to 1800 HV
Second carbon hard film 42b
Film thickness: 1 nm
Atomic fraction of hydrogen: 6% to 14%
Hardness: 2000 HV to 2500 HV Thus, it was ascertained that changing the angles, at which ion beams are incident on the air bearing surface at the time of forming first and second carbon hard films 42a and 42b, allowed the atomic fraction of hydrogen in the protective film to be controlled and the hardness to be controlled as well.

It was confirmed that a magnetic head slider provided with the DLC film had passed 20000 cycles of the CSS test (Contact Start Stop Test), and had the same reliability as in the case where a magnetic head slider is provided with a Si intermediate layer.

Furthermore, a corrosion test was conducted to confirm whether a protective film had also been formed or not in minute holes and grooves of the air bearing surface. The test was conducted to ascertain whether the bar had corroded or not in a condition in which the bar (or the slider) was soaked in an acid solution. Unless the protective film is firmly formed inside minute holes or grooves, corrosion occurs at those portions. While corrosion occurred at a probability of about 70% according to a conventional method, the test results proved that corrosion occurred at a probability of 5% or less in the present example.

It was also confirmed that the film thickness of the protective film was less dispersed in the present example. As one example, the range of film thickness was determined in which the dispersion of film thickness is ±3 σ or less (where σ refers to standard deviation). The probability in which the dispersion of film thickness is ±3 σ or less is 98%, assuming that dispersion follows a normal distribution. It was also ascertained that in the conventional method, film thickness falling within the range of ±9.5% of a mean value accounted for 98% of the total, whereas in the present invention, film thickness falling within the range of ±6.5% of a mean value accounted for 98% of the total, thereby dispersion of film thickness itself was reduced.

Although a certain preferred embodiments of the present invention have been shown and described in detail, it should be understood that various changes and modifications may be made without departing from the spirit or scope of the appended claims.

What is claimed is:

1. A slider comprising:
an air bearing surface which is arranged to face a recording medium; and
a protective film which covers at least a part of the air bearing surface; wherein
the protective film includes a first protective film formed on the air bearing surface and made of an amorphous material based on carbon and hydrogen and a second protective film formed to cover the first protective film and made of an amorphous material based on carbon and hydrogen, the atomic fraction of hydrogen in the second protective film is lower than that in the first protective film, and the first protective film has a hardness of 1400-1800 HV and the second protective film has a hardness of 2000-2500 HV.

2. The slider according to claim 1, wherein the atomic fraction of hydrogen in the second protective film ranges between at least a minimum of 6% and a maximum of 14%.

3. The slider according to claim 1, wherein the atomic fraction of hydrogen in the first protective film ranges between at least a minimum of 25% and a maximum of 28%.

4. The slider according to claim 1, wherein a Si-inclusive layer is not provided between the first protective film and the air bearing surface.

5. The slider according to claim 1, wherein the first protective film directly contacts the air bearing surface.

6. The slider according to claim 4, wherein the first protective film directly contacts the air bearing surface.

7. The slider according to claim 1, wherein the air bearing surface is ion-beam etched, and wherein the first and second protective films are each formed using an ion-beam assisted deposition technique.

8. The slider according to claim 1, wherein the protective film covers only an area projecting towards the recording medium.

9. The slider according to claim 8, wherein the protective film covers only a reading/writing part of the air bearing surface.

10. The slider according to claim 8, wherein the protective film covers only rails formed on the air bearing surface.

11. The slider according to claim 8, wherein the protective film covers only a reading/writing part of, and rails formed on, the air bearing surface.

* * * * *